(No Model.)

H. A. ADAMS.
ADJUSTING MECHANISM FOR HARVESTER FRAMES.

No. 256,813. Patented Apr. 25, 1882.

Witnesses
W. C. Corlies
Jno. C. MacGregor

Inventor
Henry A Adams
By Coburn & Thacher
Attorneys

N. PETERS, Photo-Lithographer, Washington, D. C.

UNITED STATES PATENT OFFICE.

HENRY A. ADAMS, OF SANDWICH, ILLINOIS.

ADJUSTING MECHANISM FOR HARVESTER-FRAMES.

SPECIFICATION forming part of Letters Patent No. 256,813, dated April 25, 1882.

Application filed August 10, 1881. (No model.)

*To all whom it may concern:*

Be it known that I, HENRY A. ADAMS, a citizen of the United States, residing at Sandwich, in the county of De Kalb and State of Illinois, have invented certain new and useful Improvements in Adjusting Mechanism for Harvester-Frames, which are fully set forth in the following specification, reference being had to the accompanying drawings, in which—

Figure 1:
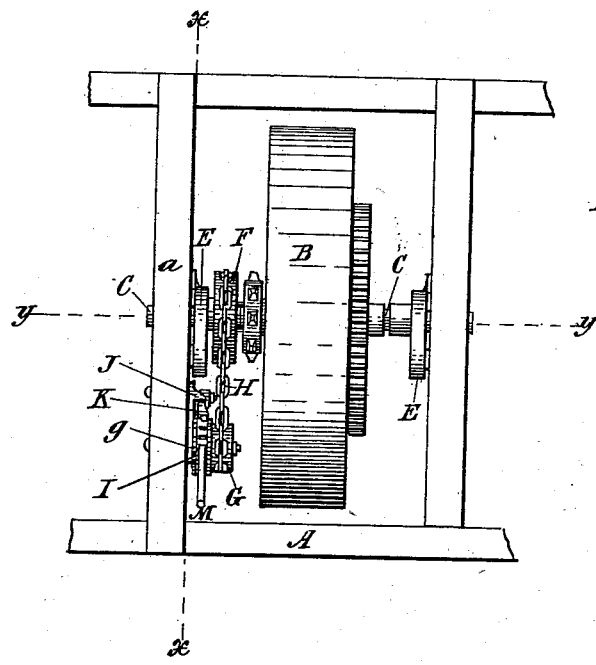
Figures 2, 3:
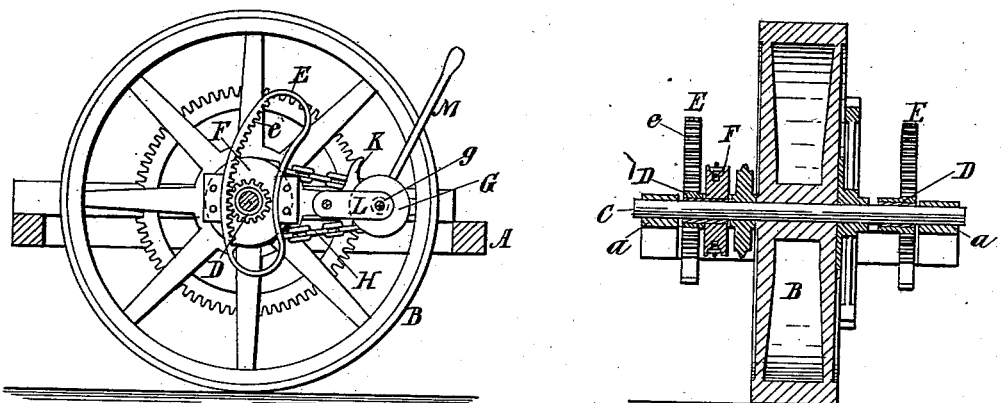
Figures 4, 5, 6:
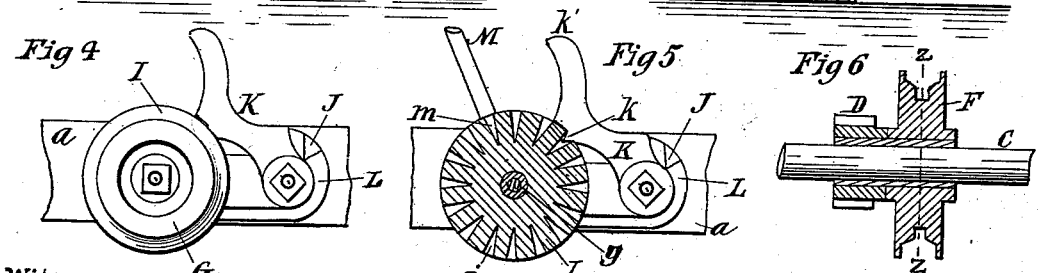
Figure 7:
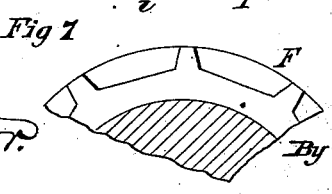

Figure 1 represents a plan view of the main wheel and portion of the main frame adjacent thereto of a harvester; Fig. 2, a vertical section of the same, taken on the line $xx$, Fig. 1; Fig. 3, a similar section taken on the line $yy$, Fig. 1; Fig. 4, a detail elevation of the ratchet-wheel and dog on an enlarged scale; Fig. 5, a similar view, the wheel being in section; Fig. 6, a detail section, on an enlarged scale, of the sprocket-wheel and pinion on the main shaft; and Fig. 7, a detail section, on an enlarged scale, taken on the line $zz$, Fig. 6.

My invention relates to that class of machines in which the main frame is adjusted vertically on the axle of the supporting-wheel.

The invention consists in special devices for effecting the ready adjustment of the frame vertically, all of which will be hereinafter fully described, and the special improvements which it is desired to secure by Letters Patent pointed out definitely in the claims.

In the drawings, A represents that portion of the main or supporting frame of a harvester which incloses the main wheel B and in which the latter is mounted.

As my present improvement relates only to the adjustment up and down of this frame, I have shown in the drawings only the portion above designated, as it is sufficient to illustrate the construction, application, and operation of the improvement in question, and the other parts of the harvester may be of any construction desired.

The main wheel is mounted loosely upon its axle, C, which extends across the frame and has its bearings in the side beams, $a$. Near each end of the axle is a small pinion, D, made fast to the axle, and arranged within curved guides E on the main frame, each one of which is provided with a rack, $e$, with which the pinions respectively engage. The construction thus far described is well known.

A sprocket-wheel, F, is attached to one of the pinions D—preferably the inside one—so that the rotation of the sprocket-wheel will also rotate the pinion. A sprocket-pinion, G, is mounted on a stud-bearing, $g$, secured to the side beam of the frame in rear of the sprocket-wheel F. The pinion G is of similar construction to the wheel F, but smaller, and a suitable chain, H, is run around the two.

Inside of the pinion G is a ratchet-and-lever wheel, I, larger in diameter than the pinion and fast to the latter. If desired, it may be made in one piece with the pinion by casting the inner face of the latter of larger diameter and thicker than the outer face. This wheel is provided with a series of radial wedge-shaped sockets, $i$, extending entirely around it, as shown in Fig. 5 of the drawings.

A pawl or dog, K, is pivoted in front of the ratchet-wheel, and is provided with a wedge-shaped projection, $k$, on its under side adapted to enter any one of the sockets $i$ of the wheel, thereby serving as a lock to hold the wheel from turning forward. The pawl is bent upward from the engaging projection to form a short handle, $k'$, by means of which it is readily lifted to disengage the wheel.

Back of the pawl (or, speaking with reference to the machine, in front of the pawl) is a stop, J, projecting inward toward the wheel slightly, so that when the pawl is thrown up to disengage from the wheel it will strike this stop and be prevented from turning over in the way of other parts of the machine. This stop is preferably cast on a plate, L, which carries the stud-journal for the sprocket-pinion and also a short stud-bearing for the pawl, and is fastened to the side beam of the frame by suitable bolts. A hand-lever, M, is made wedge-shaped at its lower end, so as to provide a wedge-shaped projection, $m$, adapted to fit the wedge-shaped sockets in the ratchet-wheel, as shown in Fig. 5 of the drawings. Obviously by means of this lever the ratchet-wheel and sprocket-pinion attached thereto may be turned in either direction.

Now, it is obvious from the construction and arrangement of the devices above described that if the ratchet-wheel and sprocket-pinion are turned backward the sprocket-wheel F will also be rotated in the same direction, thereby rotating the axle and pinions D backward and raising the main frame, while a rotation of these parts in the opposite direction or forward will lower the frame or permit it to drop of its own weight. The hand-lever is preferably independent and disconnected from the ratchet-wheel; but in order to operate my improved adjusting mechanism to raise or lower the frame it is only necessary to insert this lever in one of the wedge-shaped sockets of the ratchet-wheel, and, if the frame is to be raised, pull the lever backward, when the ratchet and sprocket wheels will be rotated backward, thereby effecting the lifting of the frame, as described above. The dog rides upon the ratchet-wheel and will engage immediately therewith when the movement of the lever is suspended.

If it is desired to lower the frame, ordinarily it is sufficient to simply raise the dog, when the weight of the frame is sufficient to cause the forward rotation of the adjusting devices, thereby permitting the frame to drop; but sometimes the parts will not move freely and the frame will stick so as to stop downward adjustment, in which case the lever comes in play again, for by throwing it forward the adjusting mechanism is rotated in the proper direction to effect the lowering of the frame. This is the reason that I prefer such a construction of the lever and wheel as will permit the former to be operative in moving the latter positively in either direction.

The journal of the sprocket G should be arranged at a point on the main frame which is at, or very nearly at, the center of the circle of which the segmental rack is an arc, or, in other words, the center of the arc of the circle through which the rack moves, otherwise the raising and lowering of the frame will cause the chain to bind; but with the arrangement above specified there will be no binding, for no strain will be brought upon the chain by the movement of the main frame.

The construction of the lever, ratchet-wheel, and pawl obviously may be varied, however, and I have intended only to show and describe what I consider a simple, cheap, and desirable construction of these devices.

I do not wish to be understood, however, as limiting my invention to the precise construction and arrangement of these devices, as herein shown and described, or to the precise construction and arrangement of the other parts belonging to my adjusting mechanism.

Having thus described my invention, what I claim as new, and desire to secure by Letters Patent, is—

1. The main frame, in combination with circular racks attached thereto, the main axle provided with pinions engaging with the racks, a sprocket-wheel on the axle, a sprocket-pinion on the main frame, having its journal at, or very nearly at, the center of the circle of which the racks are arcs, and a continuous chain running around the sprocket-wheel and sprocket-pinion, substantially as described.

2. The curved guide-racks on the main frame, in combination with pinions D and sprocket-wheel F, both on the main axle, the sprocket-pinion G, arranged at, or nearly at, the center of the curve upon which the guide-racks are described, the endless chain H, independent pawl K, and independent operating-lever M, substantially as described.

HENRY A. ADAMS.

Witnesses:
E. G. Cox,
C. N. Wood.